United States Patent
Arwe et al.

(10) Patent No.: US 8,392,567 B2
(45) Date of Patent: Mar. 5, 2013

(54) DISCOVERING AND IDENTIFYING MANAGEABLE INFORMATION TECHNOLOGY RESOURCES

(75) Inventors: John E. Arwe, Poughkeepsie, NY (US); Jeffrey A. Frey, New Paltz, NY (US); Jeffery J. Van Heuklon, Rochester, MN (US); Steve R. White, New York, NY (US); Michael D. Williams, Gardiner, NY (US)

(73) Assignee: International Business Machines Corporation, Armonk, NY (US)

( * ) Notice: Subject to any disclaimer, the term of this patent is extended or adjusted under 35 U.S.C. 154(b) by 1024 days.

(21) Appl. No.: 12/404,401

(22) Filed: Mar. 16, 2009

(65) Prior Publication Data

US 2010/0235844 A1 Sep. 16, 2010

(51) Int. Cl.
G06F 15/173 (2006.01)

(52) U.S. Cl. .................................... 709/226; 709/223

(58) Field of Classification Search .................. 709/226, 709/223
See application file for complete search history.

(56) References Cited

U.S. PATENT DOCUMENTS

| | | | |
|---|---|---|---|
| 5,878,431 A | 3/1999 | Potterveld et al. | |
| 6,154,767 A | 11/2000 | Altschuler et al. | |
| 6,477,645 B1 | 11/2002 | Drews | |
| 6,578,086 B1 | 6/2003 | Regan et al. | |
| 6,738,819 B1 | 5/2004 | Li et al. | |
| 6,901,446 B2 | 5/2005 | Chellis et al. | |
| 7,165,118 B2 | 1/2007 | Ballinger et al. | |
| 7,200,530 B2 | 4/2007 | Brown et al. | |
| 7,610,386 B1 | 10/2009 | Martinez et al. | |
| 7,698,398 B1 | 4/2010 | Lai | |
| 7,814,226 B2 * | 10/2010 | Patrick | 709/238 |
| 7,840,669 B2 * | 11/2010 | Dutta et al. | 709/224 |
| 8,032,557 B1 * | 10/2011 | Vijendra et al. | 707/783 |
| 2002/0082858 A1 * | 6/2002 | Heddaya et al. | 705/1 |
| 2003/0055945 A1 | 3/2003 | Bear et al. | |
| 2004/0024877 A1 | 2/2004 | Celle | |
| 2004/0230943 A1 | 11/2004 | Pourheidari et al. | |
| 2004/0237094 A1 | 11/2004 | Vambenepe et al. | |
| 2005/0132381 A1 | 6/2005 | Fiammante et al. | |
| 2005/0222969 A1 | 10/2005 | Yip et al. | |
| 2006/0026552 A1 | 2/2006 | Mazzitelli et al. | |

(Continued)

FOREIGN PATENT DOCUMENTS

CN 1691622 A 11/2005

OTHER PUBLICATIONS

Robert C. Chalmer and Kevin C. Almeroth, "On the Topology of Multicast Trees", IEEE/ACM Transactions on Networking (TON), vol. 11, Issue 1; Feb. 2003, pp. 153-165.

(Continued)

Primary Examiner — Kevin Bates
(74) Attorney, Agent, or Firm — Cantor Colburn LLP; William A. Kinnaman, Jr.

(57) ABSTRACT

Allocating resource discovery and identification processes among a plurality of management tools and resources in a distributed and heterogeneous information technology (IT) management system by providing at least one authoritative manageable resource having minimal or no responsibility for reporting its identity, minimal or no responsibility for advertising any lifecycle-related creation event for the resource, and minimal or no responsibility for advertising any lifecycle-related destruction event for the resource. A service oriented architecture (SOA) defines one or more services needed to manage the resource within the management system. A component model defines one or more interfaces and one or more interactions to be implemented by the manageable resource within the management system.

11 Claims, 9 Drawing Sheets

U.S. PATENT DOCUMENTS

| | | |
|---|---|---|
| 2006/0047742 A1 | 3/2006 | O'Neill et al. |
| 2006/0048097 A1 | 3/2006 | Doshi |
| 2006/0092950 A1 | 5/2006 | Arregoces et al. |
| 2006/0123116 A1 | 6/2006 | Rahman et al. |
| 2006/0146991 A1 | 7/2006 | Thompson et al. |
| 2006/0165040 A1* | 7/2006 | Rathod et al. ............ 370/335 |
| 2006/0212473 A1 | 9/2006 | Carusi et al. |
| 2006/0253420 A1 | 11/2006 | Hinton et al. |
| 2006/0277606 A1 | 12/2006 | Yunus et al. |
| 2006/0288071 A1 | 12/2006 | Bigioi et al. |
| 2007/0022154 A1 | 1/2007 | Saunders et al. |
| 2008/0127047 A1* | 5/2008 | Zhang et al. ............ 717/104 |
| 2008/0141280 A1* | 6/2008 | Azulai ............ 719/317 |
| 2009/0089408 A1 | 4/2009 | Bou-Diab et al. |
| 2009/0132708 A1* | 5/2009 | Hayward ............ 709/226 |
| 2009/0228517 A1 | 9/2009 | Arwe et al. |
| 2010/0049833 A1 | 2/2010 | Matthews et al. |
| 2010/0122328 A1 | 5/2010 | Betzler et al. |
| 2010/0131650 A1 | 5/2010 | Pok et al. |
| 2010/0332490 A1 | 12/2010 | Bauer et al. |

OTHER PUBLICATIONS

Katia Obraczka and Grig Gheorghiu, "The Performance of a Service for Network-Aware Applications". Symposium on Parallel and Distributed Tools archive, Proceedings of the SIGMETRICS symposium on Parallel and distributed tools, Welches, Oregon, United States, pp. 81-91, 1998.

K. Taura, K. Kaneda, T. Endo, A. Yonezawa, "Phoenix: a Parallel Programming Model for Accomodating Dynamically Joining/Leaving Resources", Principles and Practice of Parallel Programming, San Diego, California, USA, pp. 216-229; 2003.

Lan Wu, Service Discovery for Personal Networks, A Thesis Report, Presented to the INFOTECH Program of University of Stuttgart, Dec. 2004, pp. 1-90.

* cited by examiner

DISCOVERING AND IDENTIFYING MANAGEABLE INFORMATION TECHNOLOGY RESOURCES

BACKGROUND

This invention relates to the field of computer systems management and, in particular, to methods, hardware products, and computer program products for identifying and discovering information technology (IT) resources.

In present-day IT management systems, it is necessary to manage a plurality of resources as well as a plurality of relationships among these resources. Unfortunately, the resources that are to be managed are often unaware and uninvolved in their manageability. This leads to many issues with respect to how the resources are discovered, how they are identified, and the overall coherency and integrity of the management system itself. The lack of involvement from the resources results in management tools having to take on a multiplicity of resource management responsibilities. This allocation of responsibility is inefficient and ultimately results in a lack of integration and interoperability between the various management tools used within a typical datacenter.

Resource and relationship discovery illustrates one example of the problems that may arise in the context of existing IT management systems. More specifically, one of the first tasks that today's management tools are required to perform is to locate and index the resources and resource interrelationships that are to be managed. This is often accomplished with periodic scanning, data gathering and probing techniques that attempt to learn as much about the IT management system environment as possible. Unfortunately, this process is error prone and nondeterministic. Failure to locate the same data on subsequent discovery runs are often misinterpreted and assumed to imply that a given resource no longer exists. Correlation is used to determine if different information refers to the same resource. In reality, the entire present-day approach of discovering resources and relationships is fundamentally nothing more than a guessing game.

Resource discovery is related to resource identification. An identity must be unique in time and space for maximum utility, whereas commonly used resource identifiers can be and are often re-used; thus, these common identifiers are names, not identities. Realizing that resources themselves do not provide any value usable as an identity, today's management tools and systems have taken on the responsibility as the naming authority for the resources that they are managing by forging identities on behalf of the resources they manage. The scope and lifecycle for this identity is then tied to the management tool and is therefore separate and distinct from the resource. This leads to resources having many independent and unique identities that are narrowly scoped to the tools that have assigned them. Furthermore, identities are typically assigned based on the use of correlation, which is imprecise and inconsistent.

In view of the foregoing shortcomings, what is needed is a technique for efficiently allocating resource discovery and identification processes among a plurality of tools and resources in an IT management system. The technique should offer an evolutionary approach that allows shifts in responsibilities for these processes to occur over an extended period of time.

SUMMARY

A computer program product includes a tangible storage medium readable by a processing circuit and storing instructions for execution by the processing circuit for facilitating a method for allocating resource discovery and identification processes among a plurality of management tools and resources in a distributed and heterogeneous IT management system. The method includes providing at least one authoritative manageable resource having minimal or no responsibility for reporting its identity, minimal or no responsibility for advertising any lifecycle-related creation event for the resource, and minimal or no responsibility for advertising any lifecycle-related destruction event for the resource; using a service oriented architecture (SOA) to define one or more services needed to manage the resource within the management system; and using a component model to define one or more interfaces and one or more interactions to be implemented by the manageable resource within the management system.

A hardware product and a computer program product corresponding to the above-summarized method is also described and claimed herein. Other methods, hardware products, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

An information technology (IT) management system includes a plurality of manageable resources interconnected over a network, the manageable resources comprising one or more processor nodes capable of communicating with other processor nodes, and wherein the one or more processor nodes are configured to implement a method for allocating resource discovery and identification processes among a plurality of management tools and resources in a distributed and heterogeneous IT management system. The method includes providing at least one authoritative manageable resource having minimal or no responsibility for reporting its identity, minimal or no responsibility for advertising any lifecycle-related creation event for the resource, and minimal or no responsibility for advertising any lifecycle-related destruction event for the resource; using a service oriented architecture (SOA) to define one or more services needed to manage the resource within the management system; and using a component model to define one or more interfaces and one or more interactions to be implemented by the manageable resource within the management system.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION OF THE INVENTION

As a preliminary matter, it should be noted that Web Services Distributed Management (WSDM) and its dependent and related standards will provide an illustrative context in which to describe various exemplary embodiments of the invention disclosed herein. It is to be clearly understood that this invention is not limited strictly to a realization using Web services and WSDM. Rather, the methods, hardware products, and computer program products described herein are much more general and could be manifested using any of a variety of different technologies and standards. In understanding the methods, computer program products, and hardware products disclosed herein, a greater emphasis should be placed on the semantic definitions to be provided hereinafter relative to the specific syntax and protocol definitions used to realize the semantic definitions.

Figure 1:
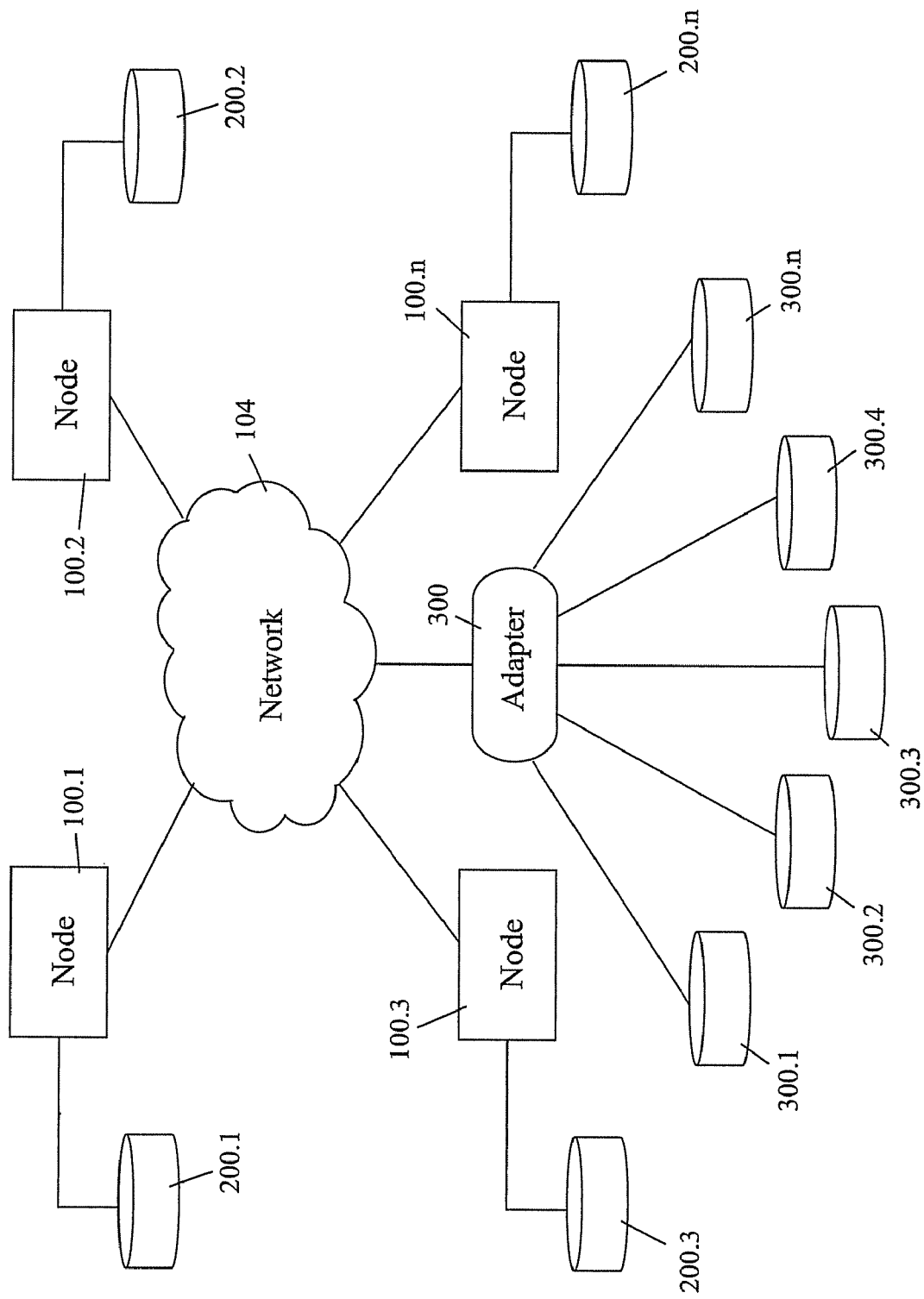
FIG. 1 is a block diagram setting forth an illustrative distributed and heterogeneous IT management system in which the present invention may be implemented.

FIG. 1 is a block diagram setting forth an illustrative distributed and heterogeneous IT management system in which the present invention may be implemented. In particular, a plurality of manageable resources in the form of nodes 100.1 through 100.n are interconnected over a network 104 through any suitable means, such as one or more adapters, cables, switches, wireless communication links, or any of various combinations thereof. In preferred embodiments of the present invention, each node 100.i of nodes 100.1 through 100.n is a processor node capable of communicating with other processor nodes, illustratively using the publicly defined Transmission Control Protocol/Internet Protocol (TCP/IP) messaging protocol by way of example. While this protocol is referred to as an Internet Protocol, it should be noted that use of this term herein does not imply the existence of any Internet connection, nor does it imply dependence upon the Internet in any way. It is simply the name of a conveniently used, well characterized communication protocol suitable for use within a connected network of data processing nodes.

Each node 100.i may include one or more Central Processing Units (CPUs), some or all of which share memory with one another. This memory can be implemented using any computer readable storage medium such as electronic memory, magnetic memory, optical memory, or any of various combinations thereof. One or more of these CPUs are capable of implementing an operating system. Each node 100.i may be connected locally to a volatile or non-volatile storage device such as a Direct Access Storage Device (DASD) unit or other similar storage device 200.i, where i is an integer greater than or equal to 1, but less than or equal to n. Thus, each node 100.i is capable of performing I/O operations on a corresponding storage device 200.i.

Storage device 200.i typically comprises a rotating magnetic disk storage unit, sometimes referred to as a disk drive. However, the scope of the present invention includes any non-volatile storage mechanism capable of holding data files. The number n of nodes 100.i is not critical. Furthermore, not everything operably coupled to network 104 has to be a data processing node. A plurality of DASD storage devices 300.1 through 300.m are connected to network 104 using, for example, a network adapter 300 for maintaining communication between DASD storage devices 300.1 to 300.m and network 104.

The nodes 100.i may contain additional software and hardware, a description of which is not necessary for understanding the invention. One or more of the nodes 100.i has stored therein data representing sequences of instructions which, when executed, cause the methods described hereinafter to be performed. Thus, one or more of the nodes 100.i include computer executable programmed instructions for directing the system of FIG. 1 to implement any of the embodiments of the present invention.

The programmed instructions may be embodied in at least one hardware, firmware, or software module resident in a memory associated with the one or more Central Processing Units (CPUs) of one or more nodes 100.i. This memory can be implemented using any computer readable storage medium such as electronic memory, magnetic memory, optical memory, or any of various combinations thereof. Alternatively or additionally, the programmed instructions may be embodied on a computer readable medium (such as a CD disk or floppy disk) which may be used for transporting the programmed instructions to the memory of the node 100.i. Alternatively or additionally, the programmed instructions may be embedded in a computer-readable, signal or signal-bearing medium that is uploaded to the node 100.i by a vendor or supplier of the programmed instructions, and this signal or signal-bearing medium may be downloaded through an interface to the node 100.i from the network 104 by end users or potential buyers.

In many situations, it is not necessary or desirable for the overall manageability of a resource to be designed and implemented by a single entity. Rather, it may be preferable for manageable resources to be represented by a combination of interfaces designed by several different designers or standards organizations. Looking ahead, implementations of manageability interfaces are likely to be constructed by multiple developers and organizations. Over time, the capabilities of a manageable resource may change as new software is provisioned into the environment. In order to minimize the disruption of adding new domain-specific capabilities to existing resources, it would be preferable if capabilities could be added to manageable resources in a dynamic manner, such that multiple manageable resources could be logically combined at deployment time or run time.

Figure 2:
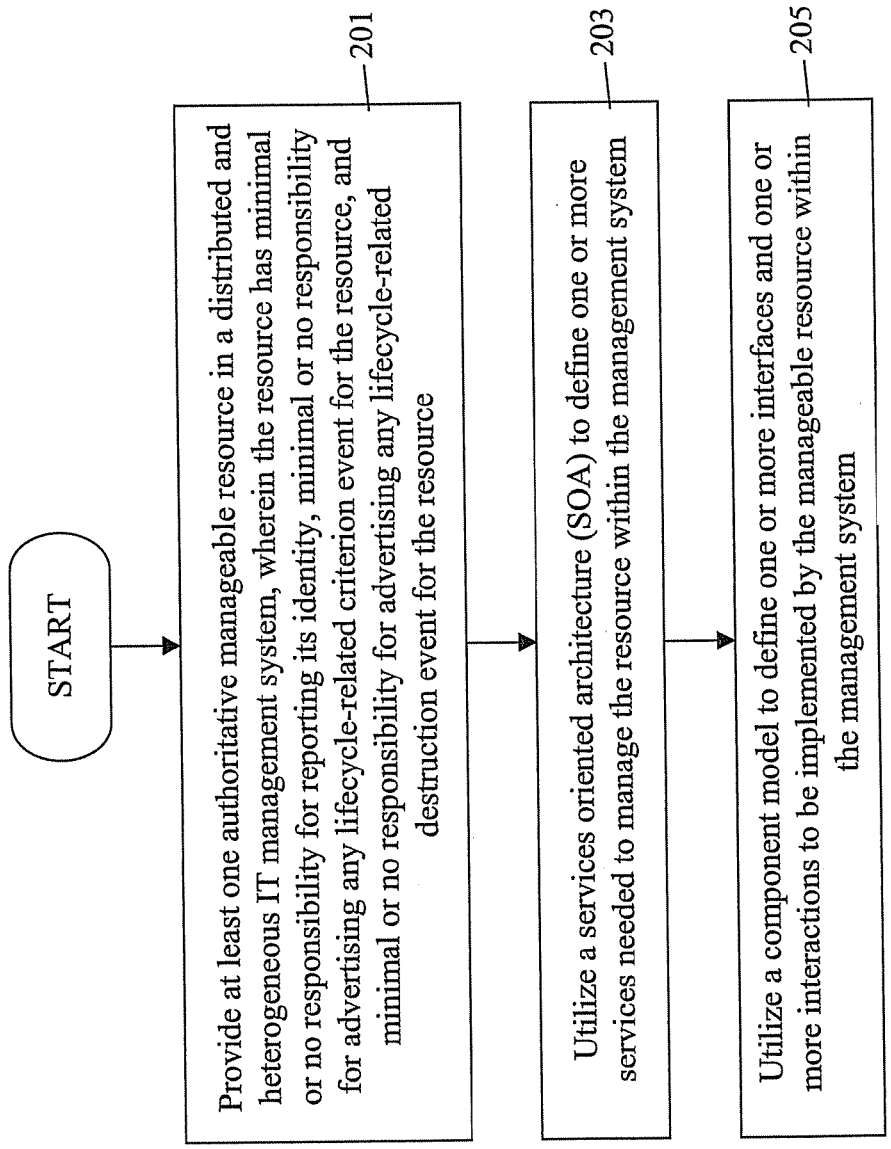
FIG. 2 is a flowchart setting forth an illustrative operational sequence for allocating resource discovery and identification processes among a plurality of management tools and resources in a distributed and heterogeneous IT management system.

FIG. 2 is a flowchart setting forth an illustrative operational sequence for allocating resource discovery and identification processes among a plurality of management tools and resources in a distributed and heterogeneous IT management system. The operational sequence commences at block 201 where at least one authoritative manageable resource is provided, wherein the resource has minimal or no responsibility for reporting its identity, minimal or no responsibility for advertising any lifecycle-related creation event for the resource, and minimal or no responsibility for advertising any lifecycle-related destruction event for the resource. Next, at block 203, a service oriented architecture (SOA) defines one or more services needed to manage the resource within the management system. The operational sequence advances to block 205 where a component model defines one or more interfaces and one or more interactions to be implemented by the manageable resource within the management system.

Authoritative Manageable Resources

What fundamentally defines an authoritative manageable resource is that the resource has taken responsibility for its identity, the representation of its inherent state and lifecycle management. In all cases, these capabilities have been fully encapsulated and are inseparable from the resource itself. This is described as "fully encapsulated", meaning that an authoritative manageable resource will implement these properties and behaviors via well-defined interfaces included in the component model. An authoritative manageable resource will also implement the interactions and protocols required by the services within the management system.

The various components within the management system are able to differentiate between authoritative manageable resources and non-authoritative management resources. The component model defines an Authoritative Manageable Resource interface that includes an identity property that is to be implemented by authoritative manageable resources. This interface is not implemented by non-authoritative resources. Implementing this interface will allow other components in the management system to recognize the resource as authoritative. The characteristics and semantics of a manageable resource identity are significant. An identity must be globally unique in both time and space, immutable and inherently a part of the resource's state.

Services in an SOA Based Management System

The shift in responsibilities between the management tools and manageable resources is further supported by the definition of a number of resource and management tool agnostic services. These services provide the basis for a distributed and heterogeneous management 'platform' that provide an appropriate de-coupling between the resources and tools managing the resources. These components are defined as services as part of an overall service oriented architectural (SOA) approach.

There are four services defined as part of the SOA based Management System:

1. A Domain service provides a directory to the other services within the domain.

2. A Resource Home Registry service provides an index of the manageable resources implementation classes that have been deployed into the domain.

3. A Resource Instance Registry service provides an index of all the manageable resources instances within the domain.

4. A Notification Broker service provides a well-defined topic space that can be published and subscribed to by event producers and consumers.

Figure 3:
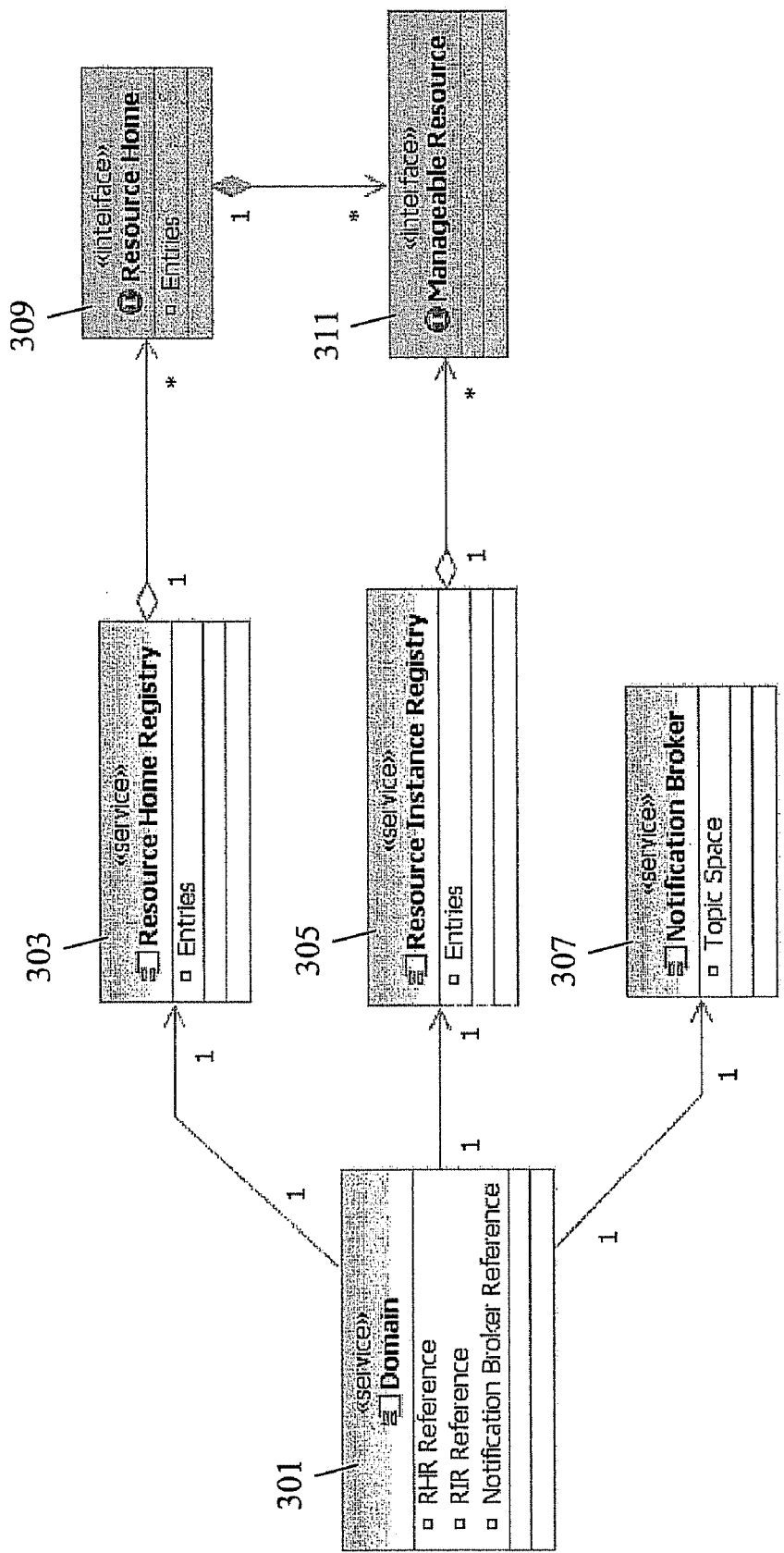
FIG. 3 is a class diagram illustrating a set of logical interrelationships for implementing a domain service for allocating resource discovery and identification processes among a plurality of management tools and resources.
Figure 5:
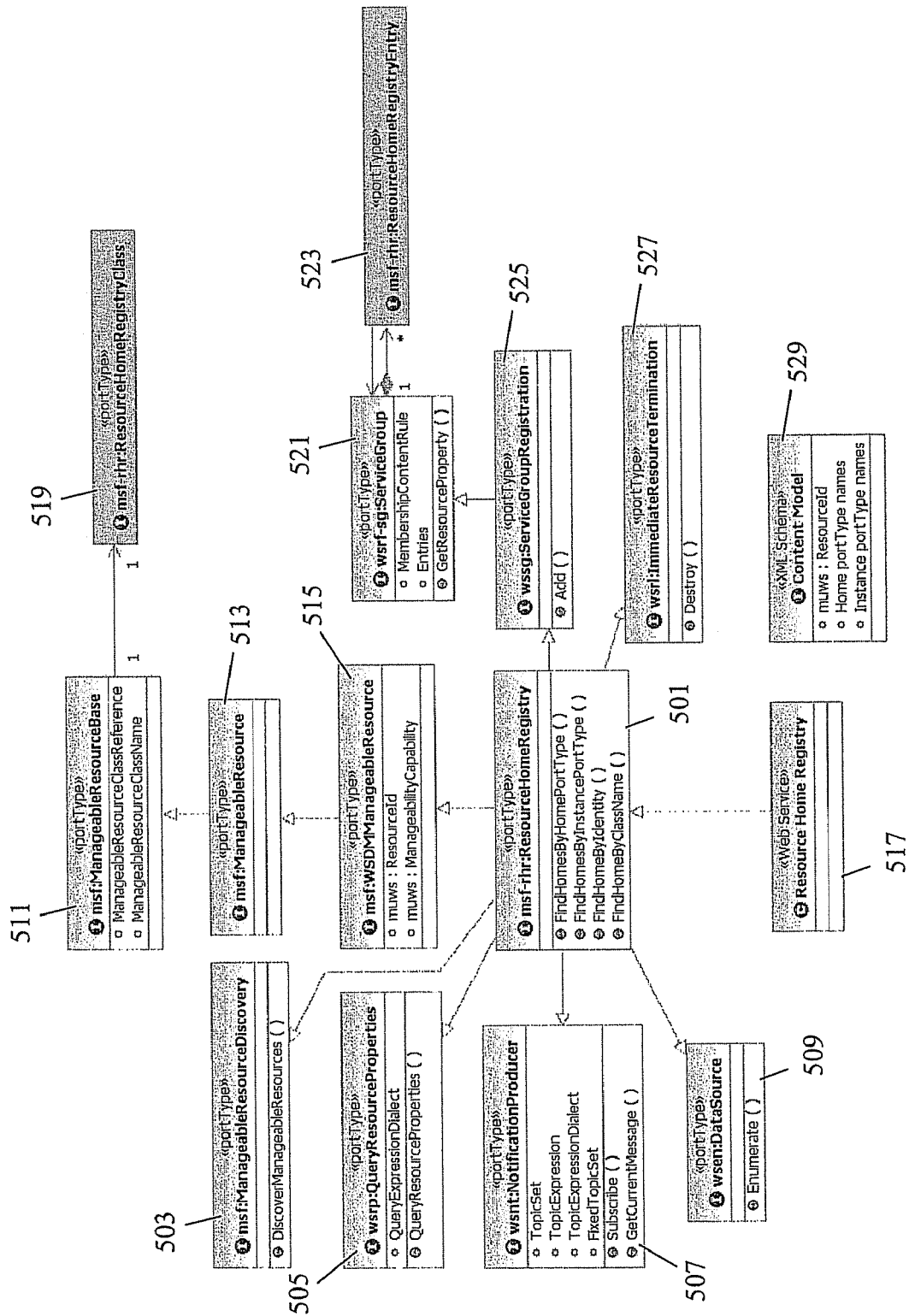
FIG. 5 is a class diagram illustrating a set of logical interrelationships for implementing a resource home registry for allocating resource discovery and identification processes among a plurality of management tools and resources.
Figure 6:
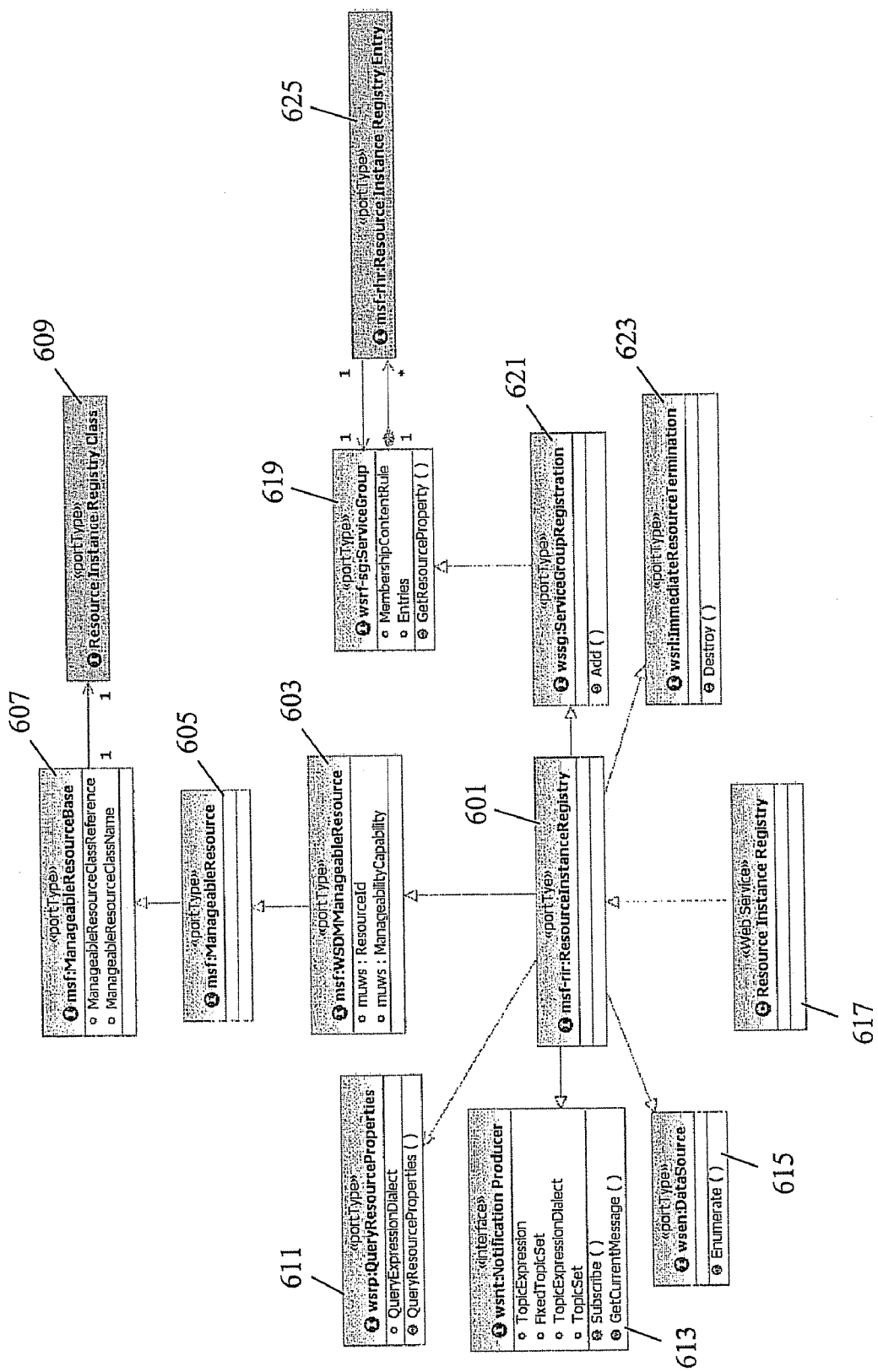
FIG. 6 is a class diagram illustrating a set of logical interrelationships for implementing a resource instance registry for allocating resource discovery and identification processes among a plurality of management tools and resources.
Figure 7:
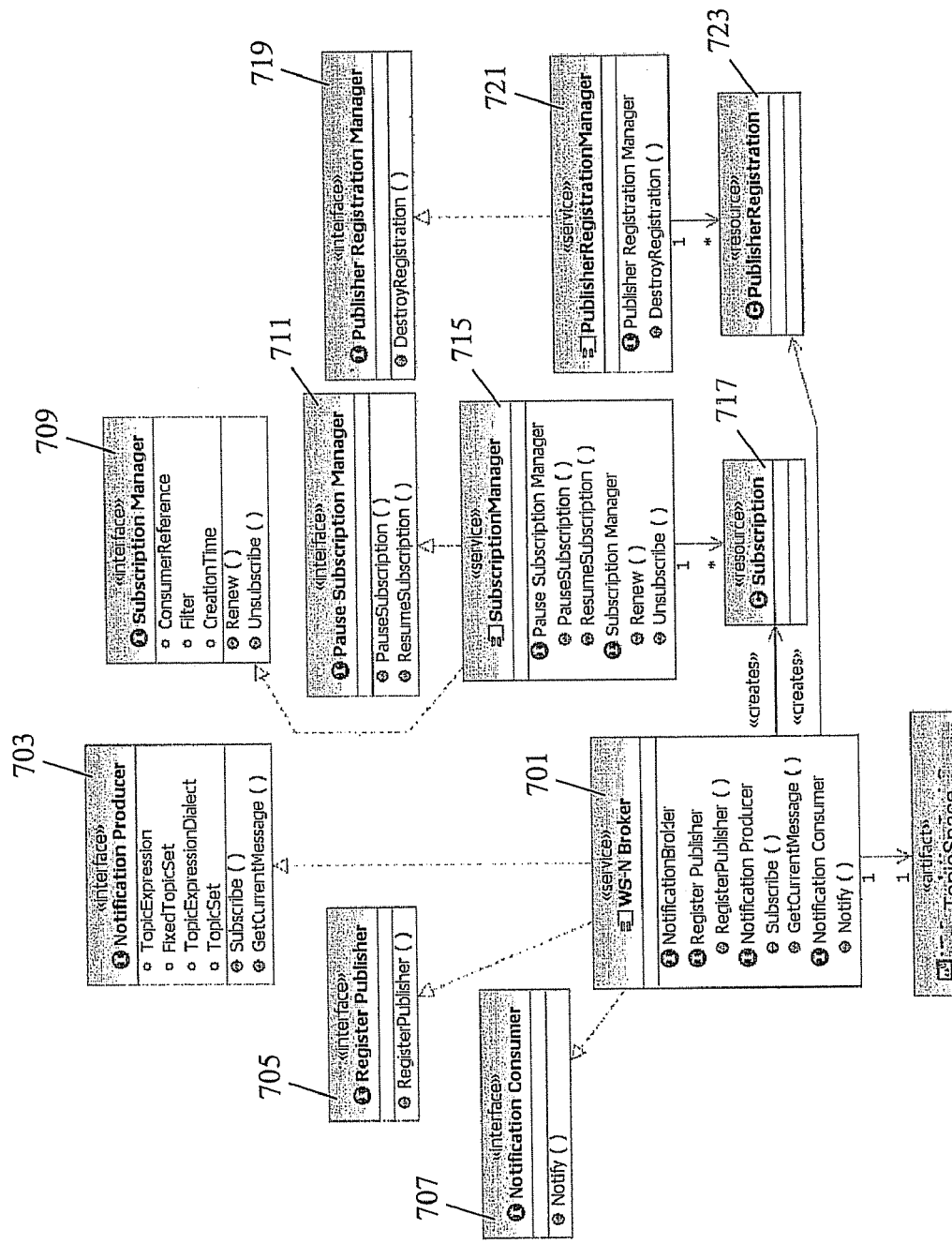
FIG. 7 is a class diagram illustrating a set of logical interrelationships for implementing a notification broker for allocating resource discovery and identification processes among a plurality of management tools and resources.

FIG. 3 is a block diagram illustrating a set of logical inter-relationships for implementing a domain service 301 for allocating resource discovery and identification processes among a plurality of management tools and resources. More specifically, FIG. 3 illustrates the domain service 301 and its relationship to a plurality of other services to be described in greater detail hereinafter. These services include a resource home registry 303, a resource instance registry 305, and a notification broker 307. An illustrative example for implementing the resource home registry 303 is shown in FIG. 5 as a resource home registry 501, wherein the resource home registry 501 is implemented as a Web Services Resource Framework (WSRF) Web Services (WS)-ServiceGroup. An illustrative example for implementing the resource instance registry 305 (FIG. 3) is shown in FIG. 6 as a resource instance registry 601, wherein the resource instance registry 601 is implemented as a WSRF WS-ServiceGroup. An illustrative example for implementing the notification broker 307 (FIG. 3) is shown in FIG. 7 as a notification broker 701, wherein the WS-N Broker 701 is implemented as a Web Services Resource Framework (WSRF) Web Services (WS)-ServiceGroup. The resource home registry 501 (FIG. 5), the resource instance registry 601 (FIG. 6), and the WS-N broker 701 (FIG. 7) interfaces are described in further detail with reference to FIGS. 5-7 as part of a manageable resource component model.

Returning now to FIG. 3, the domain service 301 provides a root directory to other management services within the same management domain. Minimally, the domain contains references/pointers to exactly one resource home registry 303, one resource instance registry 305 and one notification broker 307. The domain may, but need not, have a well known address that will be used by client applications to address any bootstrapping issues. The resource instance registry 305 contains a reference or a pointer to one or more manageable resources 311, and the resource home registry 303 contains a reference or a pointer to one or more resource homes 309.

For many system applications, one mantra to developing web-accessible applications is the concept of a stateless medium. This concept arises due to the inherent design behind the base Web protocol: hypertext transfer protocol (HTTP). However, conventional wisdom has shown that most interactions between client and server require maintaining some form of state in order to execute appropriately; thus, WSRF is a specification designed to deal with stateful resources in the context of Web services. WSRF establishes the means by which to expose persistent resources. A resource from the vantage point of WSRF can be interpreted as any device or application component that has an extended lifecycle (not just a simple request/response), which has to be addressed via Web services.

Generally, the classical mechanism for dealing with stateful data is provided in the application itself. In essence, the management and state of information for the application requester is hidden from the provider and vice versa. While this approach is workable under some scenarios, the needs brought about by elaborate Web services designs in which a requester or provider might require a complete snapshot regarding the state of a resource is often a limitation, an aspect which is tackled by WSRF.

WSRF being a framework, is comprised of the following elements:

WS Resource: Defines how Web services can be used to represent multiple resource instances.

WS-ResourceProperties (WSRF-RP): Specifies the actual means for interacting with the properties declared in a WS-Resource.

WS-ResourceLifetime (WSRF-RL): Defines how to monitor the lifecycle of and destroy a WS-Resource.

WS-ServiceGroup (WSRF-SG): Specifies how to aggregate WS-Resources.

WS-BaseFaults (WSRF-BF): Defines a format for SOAP faults thrown by WSRF services.

Semantics aside, most implementation support for WSRF includes provisions for all of the aforementioned elements. Having covered this basic background, it is possible to elaborate on what it actually means to have Web services enabled with WSRF. A Web service contract in the form of WSDL can become extremely verbose—not to mention complex—when brokering requests between resources that can change their state based on user and consumer input. A typical scenario could be that of a tracking system or a shopping cart. Every interaction or round trip requires that each contract exchange be modified to include such state changes in a piecemeal fashion, but with WSRF this approach changes. WSRF defines a Resource Property Document—the backbone of WSRF—which is actually an XML document completely separate from the service description provided in a WSDL contract. The only relation this document has to the WSDL descriptor is a pointer in the form of an Endpoint Reference as defined by WS-Addressing.

The foregoing processes allow Web services to de-couple the service description from the resource data that changes state frequently, and effectively encapsulate resources in a separate form instead of overloading a WSDL descriptor and repeatedly transferring such information over the wire on each call. By way of illustration, in the context of the Java™ programming language, Apache WSRF provides an out-of-box WSRF implementation that one may utilize for evaluating the capabilities behind WSRF. While the medium in which Web services are deployed is constrained to operate in a stateless fashion, WSRF offers a standard and scalable approach to dealing with the aforementioned shortcomings of sharing information state across client and server.

Figure 4:
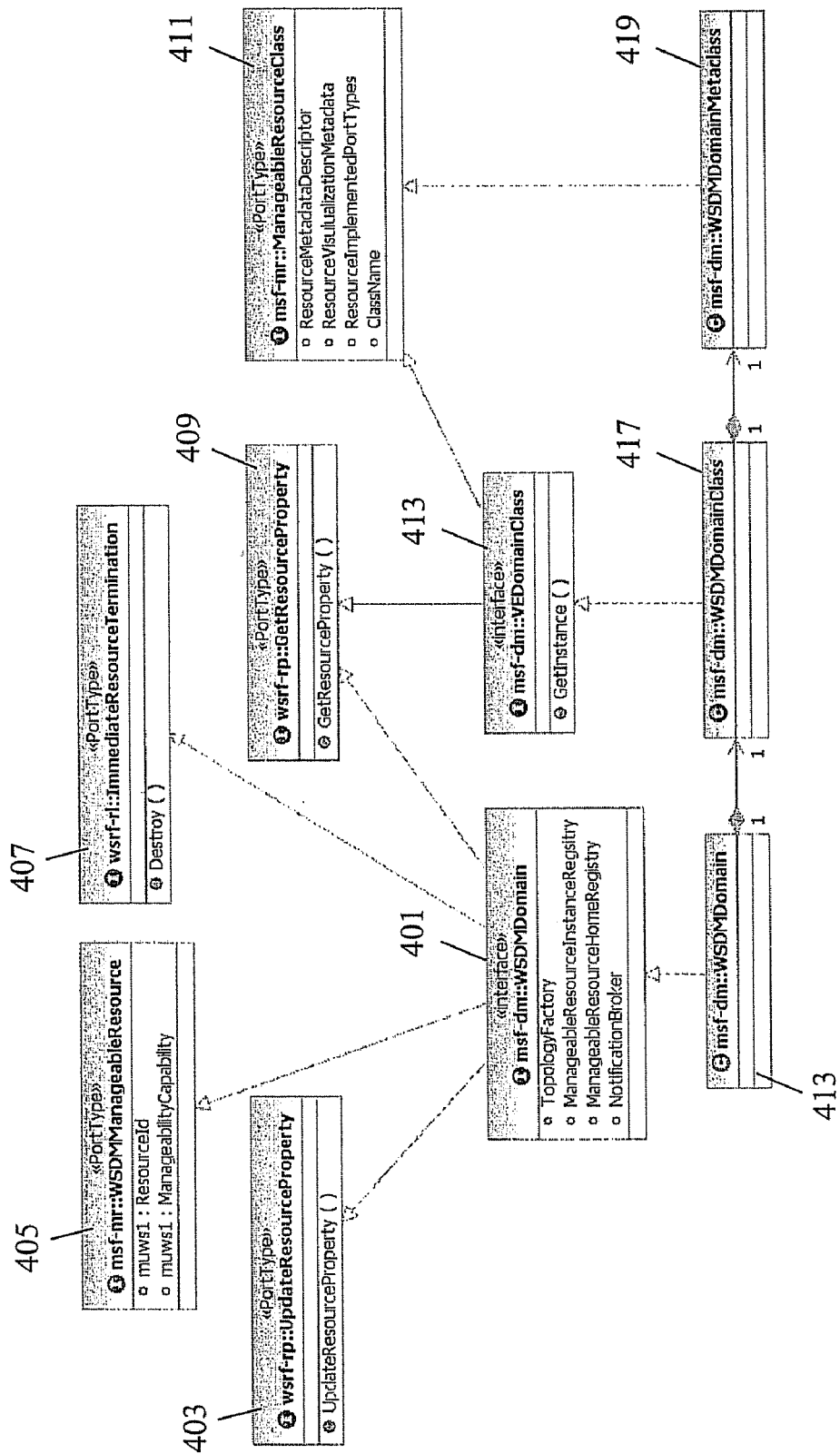
FIG. 4 is a class diagram illustrating a set of logical interrelationships for implementing the domain service of FIG. 3 as a WSRF WS-Resource.

FIG. 4 is an exemplary unified modeling language revision two (UML2) class diagram illustrating a set of logical interrelationships for implementing the domain service 301 of FIG. 3 as a WSRF WS-Resource in the form of a WSDM domain 401. In other words, one possible implementation of the domain service 301 (FIG. 3) is as a WSRF WS-Resource. UML2 is a standardized, general-purpose visual specification language for modeling objects. UML2 includes a graphical notation used to create an abstract model of a system, referred to as a UML model. UML models may be automatically transformed to other representations (e.g. Java) by means of transformation languages. UML is extensible, offering a profile mechanism and a stereotype mechanism for customization. The semantics of extension by profiles have been improved with the UML 2.0 major revision.

Class diagrams are the mainstay of object-oriented analysis and design. UML2 class diagrams show the classes of the system, their interrelationships (including inheritance, aggregation, and association), and the operations and attributes of the classes. Class diagrams are used for a wide variety of purposes, including both conceptual/domain modeling and detailed design modeling.

The WSDM domain 401 of FIG. 4 utilizes a WSRF WS-ServiceGroup that includes one or more WSRF and WS-Notification interfaces, such as an update resource property 403 port type, a manageable resource 405 interface, an immediate resource termination 407 port type, a get resource property 409 port type, and a manageable resource class 411 port type. The implementation of FIG. 4 also includes an interface for a VE domain class 413. A WSDM domain 415, a WSDM domain class 417, and a WSDM domain metaclass 419 are utilized. The WSDM domain 401 is itself an authoritative manageable resource and therefore implements the foregoing interfaces. As a WSRF WS-Resource, the WSDM domain 401 exposes one or more references/pointers to other services in the domain as resource properties that are described, accessed and updated per the definition provided in the resource property specification, which includes the update resource property 403 port type and the get resource property 409 port type.

FIG. 5 is a UML2 class diagram illustrating a set of logical interrelationships for implementing a resource home registry (RHR) 501 for allocating resource discovery and identification processes among a plurality of management tools and resources. The RHR 501 is a by-reference collection (aggregation) of a plurality of resource homes deployed into a domain. That is, the entries or members of the RHR 501 are resource homes. Each resource home is itself a registry containing the instances of a given manageable resource implementation class. In this context, "manageable resource implementation class" is meant to include the implementation of any type of manageable resource, including those acting as relationships.

As indicated in FIG. 5, one possible implementation of the RHR 501 is as a WSRF WS-ServiceGroup including one or more WSRF and WS-Notification interfaces. The RHR 501 is itself an authoritative manageable resource and therefore implements the interfaces described herein with reference to FIG. 5. A content model 529 for the RHR 501 defines the schema for each entry or member in a collection. This is the data model of the collection that can be queried by a client application. The content defined allows client applications to find resource homes by their identity, the specific portTypes/interfaces they implement or by the portTypes/interfaces implemented by the manageable resources they contain. Thus, the implementation of FIG. 5 utilizes a manageable resource discovery 503 port type, a query resource properties 505 port type, a notification producer 507 port type, a data source 509 port type, a manageable resource base 511 port type, a manageable resource 513 port type, a manageable resource 515 port type, a resource home registry 517 Web service, a resource home registry class 519 port type, a service group 521 port type, a resource home registry entry 523 port type, a service group registration 525 port type, an immediate resource termination 527 port type, and the content model 529 XML schema.

Adding resource homes to the RHR 501 is performed via an Add operation defined by the service group registration 525 port type. The Add operation is actually a factory for creating an entry in the group. An entry itself is represented as a WS-Resource and when created, is added as an Entry element in the group's resource property document—in this case the resource properties document of the RHR 501. An Entry is removed from the group when the Entry WS-Resource is destroyed. To support queries returning large result sets, the RHR 501 implements enumerations. This will allow a client to create an enumeration WS-Resource that can then be iterated over using a pull style message exchange. The creation of the enumeration WS-Resource will allow a query to be specified as an optional Filter which will initialize the enumeration WS-Resource with those service group Entries that are selected by the specific query. As a WS-Resource, the lifecycle of an enumeration instance will be handled using both immediate and scheduled resource destruction as defined in WS-ResourceLifetime.

The RHR 501 implements the notification producer 507 port type as defined in WS-BaseNotification and publishes events to a ServiceGroupModification topic defined within a ServiceGroupTopic namespace with reference to the service group 521 and the service group registration 525. This topic defines both EntryAddition and EntryRemoval messages. Clients interested in receiving asynchronous notifications as members are added and/or removed to/from the instance registry can subscribe to this topic. Note that only entry additions and deletions constitute registry membership change. Updates to individual service group entries are not required to be reported.

FIG. 6 is a UML2 class diagram illustrating a set of logical interrelationships for implementing a resource instance registry (RIR) 601 for allocating resource discovery and identification processes among a plurality of management tools and resources. The RIR 601 can logically be considered a layer above the RHR 501 (FIG. 5). In fact the RIR 601 (FIG. 6) provides the client a federated view of both authoritative and non-authoritative manageable resources within the domain. This is accomplished by the somewhat traditional resource and relationship discovery and correlation, building up an index that can be used to find resources, create topologies, and understand dependencies between resources in a customer's IT environment.

The client application view of the RIR 601 will be a single reference to all of the resources within a given domain that can be searched or queried based on specific resource metadata and state of the resource instance itself What allows this to happen is the correlation and federation performed by the RIR 601. Correlation occurs as resource instances are being added to the registry and also periodically using heuristic techniques consuming the cached information that has been collected as part of the discovery process. The federation in this context is providing a single view of all resources from all resource homes in the domain, optimizing the types of client application queries that can be supported.

One possible implementation of the RIR 601 is as a WSRF WS-ServiceGroup interface on top of a configuration management database (CMDB) to be described hereinafter with reference to FIG. 9. The UML2 diagram of FIG. 6 shows such an implementation including the WSRF and WS-Notification interfaces implemented by this service. The RIR 601 is itself an authoritative manageable resource and therefore implements the interfaces defined as part of the component defined by this disclosure.

A service group content model for the instance registry will be variable and dynamically determined from a resource model configured and associated with the RIR 601. Note that the configuration of the resource model is also dynamic, and may be extended and changed. The logically derived resource instance registry content model will include the port type names implemented by the each member represented by the respective service group entry, the manageable resource class name, and all resource properties that may be would be applicable as part of a client application query. Thus, the implementation of FIG. 6 includes a WSDM manageable resource 603 port type, a manageable resource 605 port type, a manageable resource base 607 port type, a resource instance registry class 609 port type, a query resource properties 611 port type, a notification producer 613 port type, a data source 615 port type, a resource instance registry 617 Web service, a service group 619 port type, a service group registration 621 port type, an immediate resource termination 623 port type, and a resource instance registry entry 625 port type.

Adding resources to the instance registry will be performed via an Add operation defined by the service group registration 621 port type. The Add operation is actually a factory for creating an entry in the group. An entry itself is represented as a WS-Resource and when created, is added as an Entry element in the group's resource property document—in this case an RIR 601 resource property document. An Entry is removed from the group when the Entry WS-Resource is destroyed. Query of the RIR 601 is handled using a query resource properties operation defined in query resource properties 611. The 'open' and required XPath 1.0 dialect will be supported. However, other dialects may also be possible to support much more dynamic queries and to leverage the query optimization within the underlying implementation that may be available such as a CMDB.

To support queries returning large result sets, the RIR 601 will implement enumerations. This will allow a client to create an enumeration WS-Resource that can then be iterated over using a pull style message exchange. The creation of the enumeration WS-Resource will allow a query to be specified as an optional Filter which will initialize the enumeration WS-Resource with those service group Entries that are selected by the specific query. As a WS-Resource, the lifecycle of an enumeration instance will be handled using both immediate and scheduled resource destruction as defined in WS-ResourceLifetime.

The RIR 601 implements the notification producer 613 port type as defined in WS-BaseNotification and publishes events to a ServiceGroupModification topic defined within a ServiceGroupTopic namespace. This topic defines both EntryAddition and EntryRemoval messages. Clients interested in receiving asynchronous notifications as members are added and/or removed to/from the instance registry can subscribe to this topic. Note that only entry additions and deletions constitute registry membership change. Updates to individual service group entries are not required to be reported.

As defined as part of the component model, authoritative manageable resources are responsible for publishing themselves to the RIR 601. This not only includes adding themselves to the registry at time of creation, however it also includes removing the appropriate entry during the resource's destruction. Given the somewhat loose coupling between manageable resources and the RIR 601, there is a need for a safety net to ensure the coherency of the registry's content. Specifically, a safety net is required to ensure entries exist for all manageable resources in the domain as well as a safety net to remove entries that can be determined to no longer exist within the domain. The discovery of manageable resources provides the appropriate safety net to ensure entries exist and are current, however will never result in the removal of entries. To complement this, an instance registry 'cleaner' function is defined as the mechanism to remove orphaned registry entries. This capability will run as a scheduled administrative function. The approach used to identify orphaned entries is to validate that each of the resources indexed in the registry exists within the appropriate home registry. If the resource does not exist within the appropriate home registry, the entry will be automatically removed from the resource instance registry ensuring its overall coherence and currency.

FIG. 7 is a class diagram illustrating a set of logical interrelationships for implementing a notification broker 701 for allocating resource discovery and identification processes among a plurality of management tools and resources. The notification broker 701 acts as an intermediary between asynchronous event publishers and event consumers within a given domain. Client applications subscribe to and publish events to one or more topics defined by the notification broker 701. A collection of related topics is used to organize and categorize a set of notification messages. The collection provides a means by which subscribers can reason about notifications of interest. Topics appear in several places within a WS-Notification system. As part of the publication of a message, the publisher associates it with one or more topics. When a subscriber creates a subscription, it associates the subscription with one or more topics. The producer uses these topic lists as part of the matching process: a message is delivered to a consumer if the list of topics associated with the subscription has a non-empty intersection with the list of topics associated with the message.

Minimally, the notification broker 701 provides root topics for manageable resource creation and destruction events. It is assumed that both the base topic space as well as the specific manageable resource lifecycle topics can be extended by message producers and consumers as required. One possible implementation of the notification broker 701 is as a WSRF WS-Resource. The UML2 class diagram of FIG. 7 shows such an implementation including the WSRF and WS-Notification interfaces minimally implemented by this service. The implementation of FIG. 7 includes a notification producer 703 interface, a register publisher 705 interface, a notification consumer 707 interface, a subscription manager 709 interface, a pause subscription manager 711 interface, a subscription manager 715 service, a subscription 717 resource, a topic space 713, a publisher registration manager 719 interface, a publisher registration manager 721 service, and a publisher registration 723 resource. What is implied in the UML2 class diagram of FIG. 7 is that the notification broker 701 is a factory for Subscription and PublisherRegistration resources. In this particular implementation, it is assumed that these resources are also implemented as WSRF WS-Resources.

Figure 8:
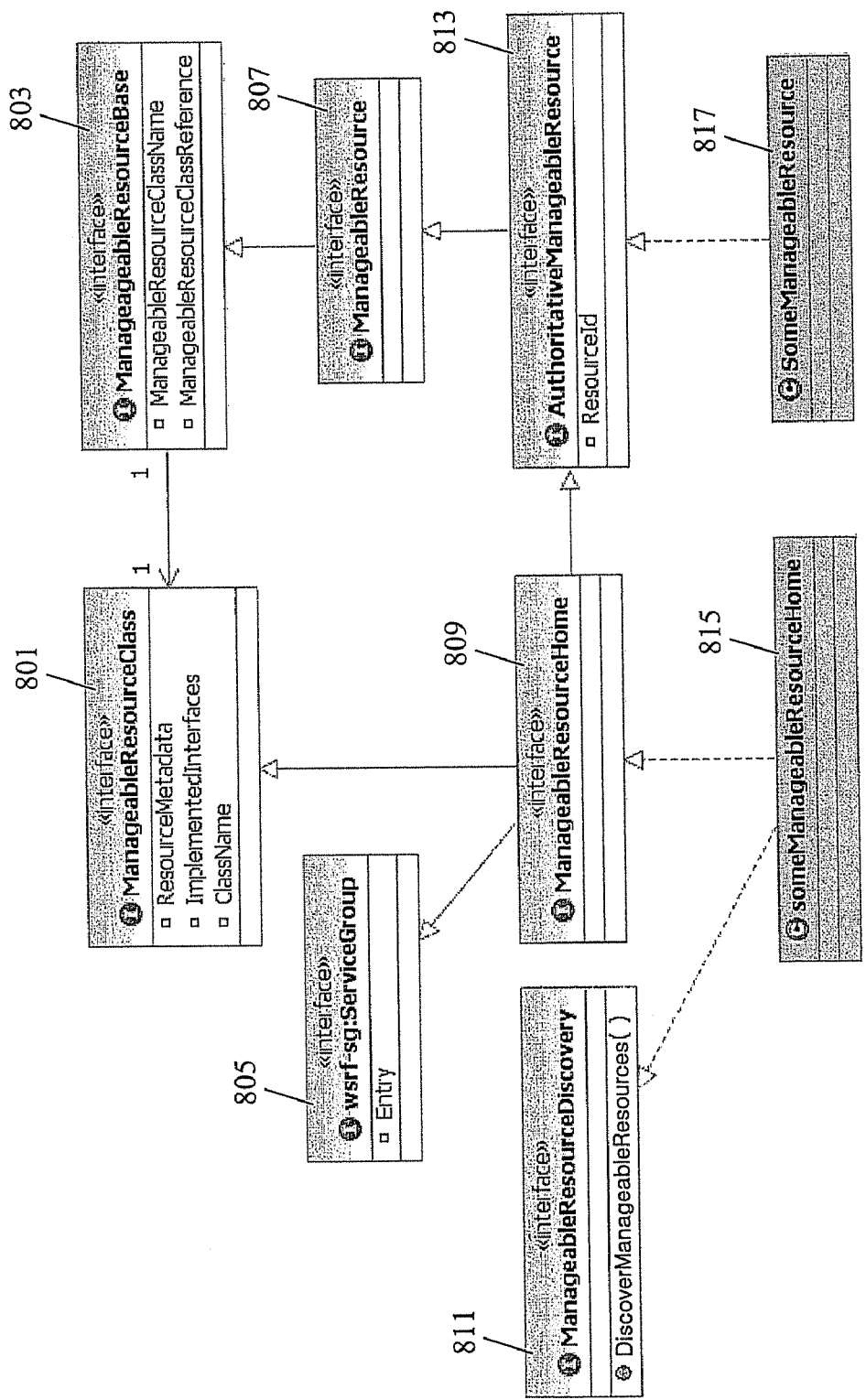
FIG. 8 is a class diagram illustrating a set of logical interrelationships for implementing a manageable resource component model for allocating resource discovery and identification processes among a plurality of management tools and resources.

FIG. 8 is a class diagram illustrating a set of logical interrelationships for implementing a manageable resource component model for allocating resource discovery and identification processes among a plurality of management tools and resources. It is important to develop definitions for the interfaces implemented by manageable resources and required interaction with the services defined above that make up the SOA based management system. It is also important to recognize that relationships between resources are handled as "relationship resources", and are therefore required to implement the interfaces defined by this component model. The interfaces defined by the component model are shown in FIG. 8. One important factor is that, within the system, there are realizations/instantiations of both Classes and Manageable Resources.

A manageable resource class 801 interface introduces a class name and class level metadata for one or more manageable resource instances of that class. The metadata minimally includes property and operation qualifiers (i.e. min and max values), metadata required to visualize the resource and the complete list of interfaces implemented by the manageable resource instances of the given class. A manageable resource base 803 interface is assumed to be implemented by all manageable resources. In fact, as indicated in FIG. 8, a manageable resource 'is a' manageable resource base. This interface introduces a reference/pointer to the class resource which can be used by a client application as a way to get the class and therefore the metadata in a consistent way for any manageable resource. This interface also requires that the class name also be directly available to provide an optimization for client applications wishing to cache metadata to avoid dereferencing the class each and every time metadata is needed. The UML2 class diagram of FIG. 8 also includes a service group 805 interface, some manageable resource home 815, and some manageable resource 817.

An authoritative manageable resource 813 interface introduces a resource identity which is only ever implemented by authoritative implementations that are able to take responsibility for a resource's identity, the representation of the resource's inherent state, and lifecycle management. Manageable Resource implementations that are not authoritative are required to simply implement a manageable resource 807 interface. This allows client applications and the services in the SOA based management system to reason about the authority of a given implementation as needed. Another important construct within the component model is that of a manageable resource home and a manageable resource home 809 interface. A manageable resource home 'is a' manageable resource class that has been extended with the service group collection capability. The primary purpose of a manageable resource home is to provide an authoritative collection of manageable resource instances much the way a CIM resource provider class provides the ability to enumerate the instances of its class. The home is also assumed to be the placement of any static properties and/or operations for the specific implementation class. An example of this could be a static factory create( ) operation that could be used to instantiate instances of the class.

A manageable resource directory 811 interface is introduced which defines a single operation, "DiscoverManageableResources". As its name implies, execution will cause the manageable resource home to drive its underlying resource instrumentation connection capabilities to "discover" the IT resources represented as manageable resource instances of the manageable resource class. For each discovered IT resource, the manageable resource home will generate an endpoint reference representing the manageable resource instance of the manageable resource implementation class. Execution of the operation will cause all manageable resource instances known to the manageable resource home to be added to the domain scoped resource instance registry.

As part of the lifecycle management requirement for authoritative manageable resources, creation and destruction events must be published to the well known resource lifecycle topics defined by the domain scoped notification broker 701 (FIG. 7). Returning to FIG. 8, it is assumed that a possible implementation of this component model could be via Web services. That is, implementing manageable resources and manageable resource classes as stateful WSRF WS-Resources. In this case, the interfaces shown in the UML above would be realized as WSDL portTypes.

Staged Migration

The techniques disclosed herein with reference to FIGS. 1-8 allow for a seamless staged migration from today's management tools and resources to the more responsible and authoritative resources as outlined herein. This is clearly required in any practical implementation, recognizing that an evolutionary approach would be required in most real world scenarios. The general approach is to update/replace references to non-authoritative manageable resources with authoritative manageable resource implementations when they are found and indexed within the domain scoped instance registry. This relies upon one or more discovery functions performed by the manageable resource home 809 interface (FIG. 8) and the correlation mechanisms of the resource instance registry 601 (FIG. 6). When an authoritative manageable resource or relationship is added to the instance registry, the registry's add operation will execute the correlation rules and determine whether or not another representation of the manageable resource instance exists. If it does, then as part of correlation, it will be determined that the newly presented manageable resource is authoritative, since it implements the authoritative interface that includes a unique identity. The endpoint reference held in the instance registry will be replaced by the endpoint reference of the authoritative instance.

When an EPR of a resource is replaced by the EPR of an authoritative manageable resource implementation within the instance registry, all of the manageable resource instance's relationships are maintained and logically migrated with the more authoritative manageable resource implementation. This is accomplished transparently within the instance registry through the use of an internal primary database keys that remain stable across manageable resource EPR replacement. The migration from a non-authoritative to authoritative implementation can be handled by client applications as a more general migration. As such, it is required that the authoritative manageable resource minimally implement the same interfaces implemented by the non-authoritative implementation. This allows client applications that had been using the non-authoritative implementation to continue to operate unchanged as new interfaces are implemented by the manageable resource including the authoritative manageable resource interface.

Figure 9:
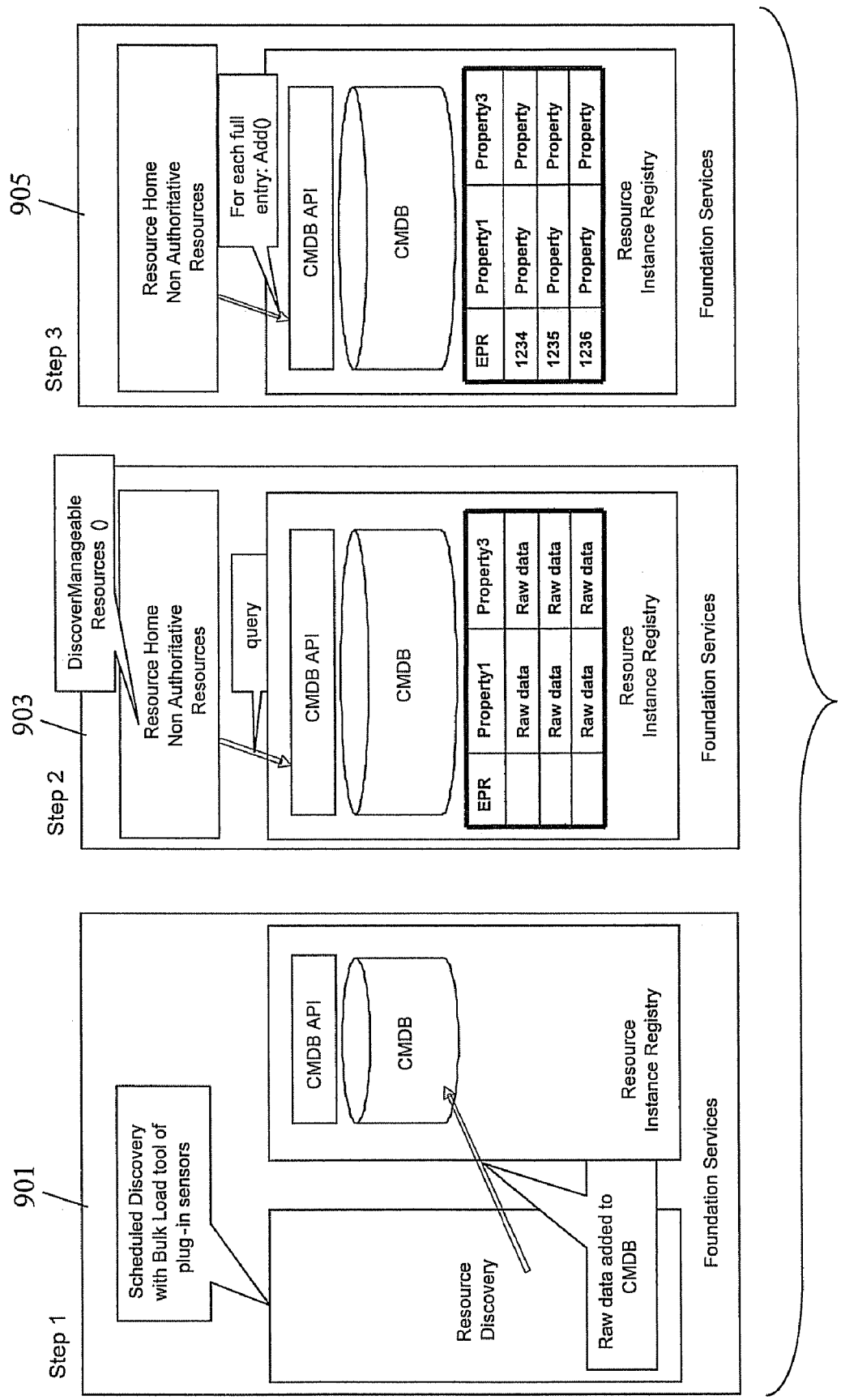
FIG. 9 is a block diagram illustrating a set of logical interrelationships for implementing a configuration management database for allocating resource discovery and identification processes among a plurality of management tools and resources.

To further aid in the evolution and shift in responsibilities to authoritative manageable resources, a non-authoritative manageable resource implementation is defined with reference to FIG. 9 that works in concert with the more traditional forms of resource and relationship discovery and the instance registry. Introducing such an implementation will allow for very broad coverage of resource and relationship types that are not fully instrumented or fully capable of authoritative identity and lifecycle management functions. This will be used to enable and assist in the migration of the management tools to the system and approach outlined in this disclosure.

The non-authoritative implementation defined is compliant to the component model and is assumed to be deployed into the SOA based management system described above. It is also assumed to be built as an abstraction on top of the persistence mechanism used for the instance registry that includes traditional discovery sensors and mass import data discovery technologies. The key points of its implementation are as follows: (A) Traditional discovery will add resource and relationship 'data' via un-encapsulated inserts and updates to the instance registry. This will drive the instance registry correlation, however is considered un-encapsulated given that this is not done via its external service group registration interface and is therefore not adding references to manageable resources or creating service group entries. (B) When called as part of scheduled discovery, the Discover-ManageableResources operation for the non-authoritative management resource implementation will query the underlying instance registry database looking for resources and relationships without entries or references. When found, an endpoint reference will be created and the manageable resource instance will be added to the instance registry via its service group registration interface. (C) All resource property access to the non-authoritative manageable resource will be a simple delegation to data in the instance registries database. (D) In the future when an authoritative manageable resource exists and it added to the instance registry, the reference will be replaced (migrated) to the authoritative implementation.

FIG. 9 is a block diagram illustrating a set of logical inter-relationships for implementing a configuration management database for allocating resource discovery and identification processes among a plurality of management tools and resources. One possible realization is on top of a configuration management database (CMDB). A first step 901 is performed which includes scheduled resource discovery with a bulk load tool of plug-in sensors. Raw data is added to a CMDB database in the resource instance registry 601 (FIG. 6). Returning to FIG. 9, a second step 903 is performed wherein a query is executed to discover one or more manageable resources in the resource instance registry. Next, a third step 905 is performed wherein, for each full entry, the manageable resource instance is added to the CMDB database via a CMDB application.

The foregoing exemplary embodiments may be provided in the form of computer-implemented processes and apparatuses for practicing those processes. The exemplary embodiments can also be provided in the form of computer program code containing instructions embodied in tangible media, such as floppy diskettes, CD ROMs, hard drives, or any other computer-readable storage medium, wherein, when the computer program code is loaded into and executed by a computer (such as, for example, one or more processing nodes 100.$i$ of FIG. 1), the computer becomes an apparatus for practicing the exemplary embodiments. The exemplary embodiments can also be provided in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the exemplary embodiments. When implemented on a general-purpose microprocessor, the computer program code segments execute specific microprocessor machine instructions. The computer program code could be implemented using electronic logic circuits or a microchip.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A computer program product comprising a non-transitory, tangible storage medium readable by a processing circuit and storing instructions for execution by the processing circuit for facilitating a method for allocating resource discovery and identification processes among a plurality of management tools and resources in a distributed and heterogeneous IT management system, the method including:
providing at least one authoritative manageable resource having minimal or no responsibility for reporting its identity, minimal or no responsibility for advertising any lifecycle-related creation event for the resource, and minimal or no responsibility for advertising any lifecycle-related destruction event for the resource;

using a service oriented architecture (SOA) to define one or more services needed to manage the resource within the management system;

using a component model to define one or more interfaces and one or more interactions to be implemented by the manageable resource within the management system; and performing a staged migration wherein a reference to a non-authoritative manageable resource is updated or replaced with a reference to an authoritative manageable resource implementation in response to the authoritative manageable resource implementation being located and indexing the authoritative manageable resource implementation within a domain scoped instance registry.

2. The computer program product of claim 1, wherein the SOA includes a domain service for providing a directory to one or more services other than the domain service within a domain.

3. The computer program product of claim 2, wherein the SOA includes a resource home registry service for providing an index of one or more manageable resources implementation classes that have been deployed into the domain.

4. The computer program product of claim 2, wherein the SOA includes a resource instance registry service for providing an index of all manageable resources instances within the domain.

5. The computer program product of claim 2, wherein the SOA includes a notification broker service for providing a defined topic space that can be published and subscribed to by an event producer or a consumer or both.

6. The computer program product of claim 1, further comprising implementing a configuration management database (CMDB) for allocating resource discovery and identification processes among a plurality of management tools and resources by performing scheduled resource discovery, executing a query to discover one or more manageable resources in a resource instance registry, and adding a manageable resource instance discovered in the resource instance registry to the CMDB.

7. An information technology (IT) management system, comprising:

a plurality of manageable resources interconnected over a network, the manageable resources comprising one or more processor nodes capable of communicating with other processor nodes, and wherein the one or more processor nodes are configured to implement a method for allocating resource discovery and identification processes among a plurality of management tools and resources in a distributed and heterogeneous IT management system, the method including:

providing at least one authoritative manageable resource having minimal or no responsibility for reporting its identity, minimal or no responsibility for advertising any lifecycle-related creation event for the resource, and minimal or no responsibility for advertising any lifecycle-related destruction event for the resource;

using a service oriented architecture (SOA) to define one or more services needed to manage the resource within the management system;

using a component model to define one or more interfaces and one or more interactions to be implemented by the manageable resource within the management system; and performing a staged migration wherein a reference to a non-authoritative manageable resource is updated or replaced with a reference to an authoritative manageable resource implementation in response to the authoritative manageable resource implementation being located and indexing the authoritative manageable resource implementation within a domain scoped instance registry.

8. The system of claim 7, wherein the SOA includes a domain service for providing a directory to one or more services other than the domain service within a domain.

9. The system of claim 8, wherein the SOA includes a resource home registry service for providing an index of one or more manageable resources implementation classes that have been deployed into the domain.

10. The system of claim 8, wherein the SOA includes a resource instance registry service for providing an index of all manageable resources instances within the domain.

11. The system of claim 8, wherein the SOA includes a notification broker service for providing a defined topic space that can be published and subscribed to by an event producer or a consumer or both.

\* \* \* \* \*